Dec. 4, 1951  J. W. WHITE, JR  2,577,552
AUTOMATIC FISHING REEL
Filed Feb. 19, 1947  5 Sheets-Sheet 1

Inventor
JOHN W. WHITE, JR.
Cushman Darby Cushman
Attorneys

Dec. 4, 1951   J. W. WHITE, JR   2,577,552
AUTOMATIC FISHING REEL
Filed Feb. 19, 1947   5 Sheets-Sheet 2
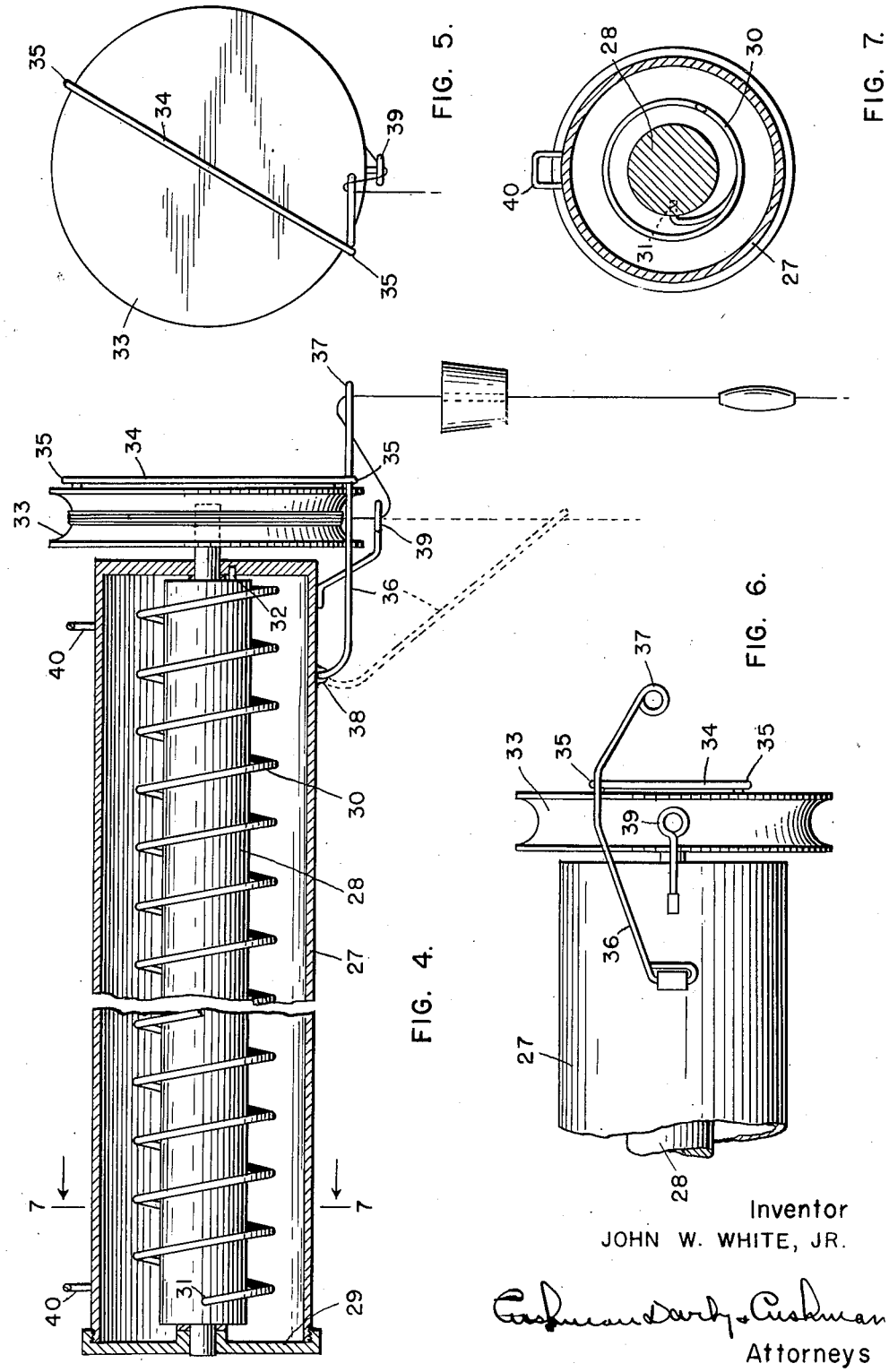
Inventor
JOHN W. WHITE, JR.
Cushman Darby Cushman
Attorneys

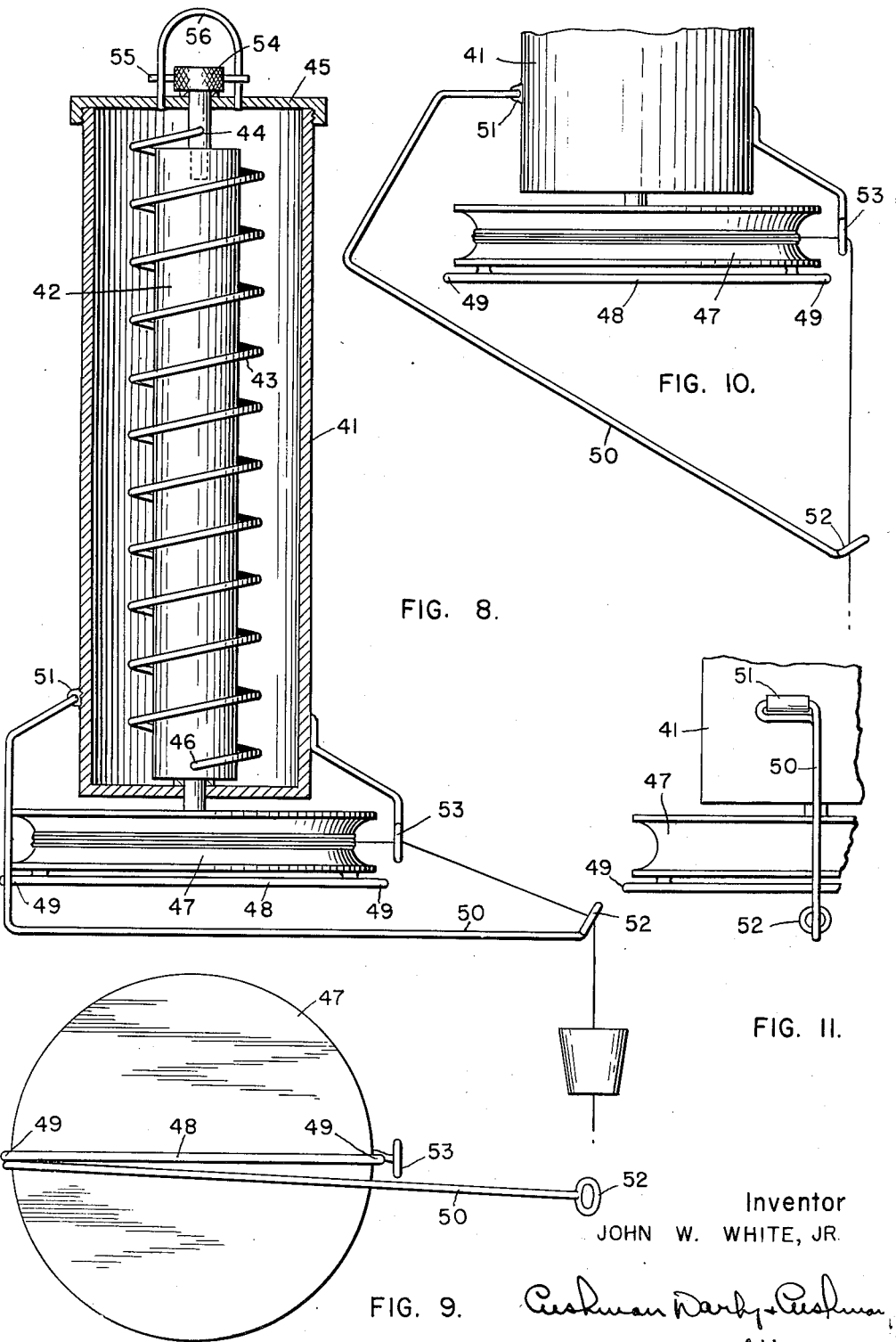

Dec. 4, 1951     J. W. WHITE, JR     2,577,552
AUTOMATIC FISHING REEL
Filed Feb. 19, 1947     5 Sheets-Sheet 4
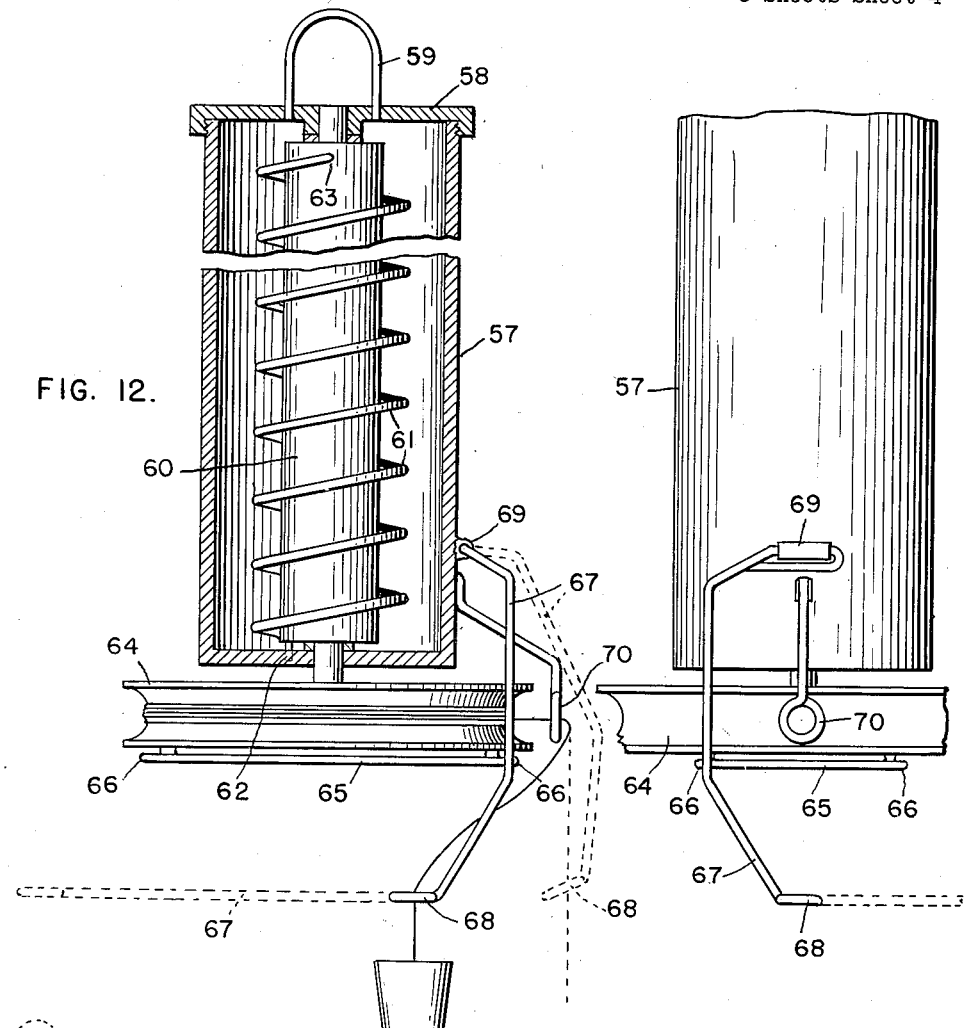
FIG. 12.
FIG. 14.
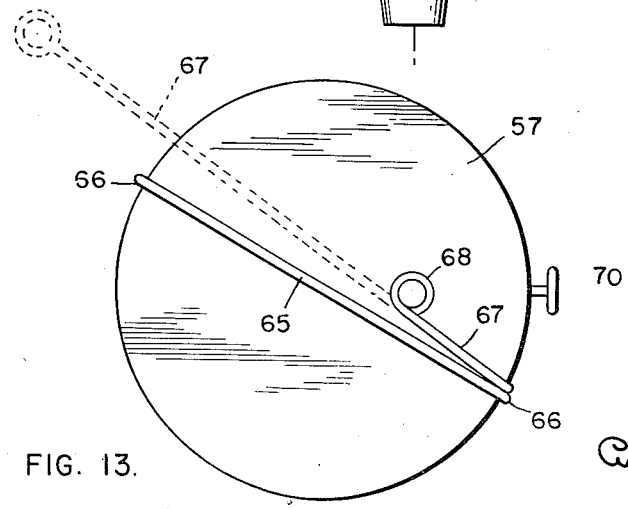
FIG. 13.
Inventor
JOHN W. WHITE, JR.
Cushman Darby Cushman
Attorneys Dec. 4, 1951  J. W. WHITE, JR  2,577,552
AUTOMATIC FISHING REEL
Filed Feb. 19, 1947  5 Sheets-Sheet 5

Inventor
JOHN W. WHITE, JR.

Cushman Darby Cushman
Attorneys

Patented Dec. 4, 1951

2,577,552

UNITED STATES PATENT OFFICE 2,577,552

AUTOMATIC FISHING REEL

John W. White, Jr., Little Rock, Ark.

Application February 19, 1947, Serial No. 729,540

15 Claims. (Cl. 242—109)

This invention relates to fishing equipment. Particularly it has to do with means for reeling in the fishing line and fish when the bait is taken, such reeling means being automatically set in motion when the line is tightened under the pull of the hooked fish.

Briefly stated, it comprises a reel on which the line is wound; a spring mounted in a suitable housing and coupled to the reel in such fashion that it will effect rotation of the reel and reeling in of the line, and spring tripping means subject to the pull of the fish, to release the spring for effecting rotation of the reel and pulling in of the catch.

The invention may be developed in various forms, and different types of the device, all embodying the same general principle of construction and operation, are disclosed herein to illustrate the invention.

In the drawings herewith, forming a part of this disclosure,

Figure 4 is a sectional view of a modified form of the reel,

Figure 5 is an end view looking from the right of Figure 4,

Figure 6 is a bottom plan view of a portion of the reel,

Figure 7 is a sectional view substantially on the line 7—7 of Figure 4,

Figure 8 is a sectional view of another modification of the reel,

Figure 9 is a bottom view of the reel shown in Figure 8,

Figure 15:
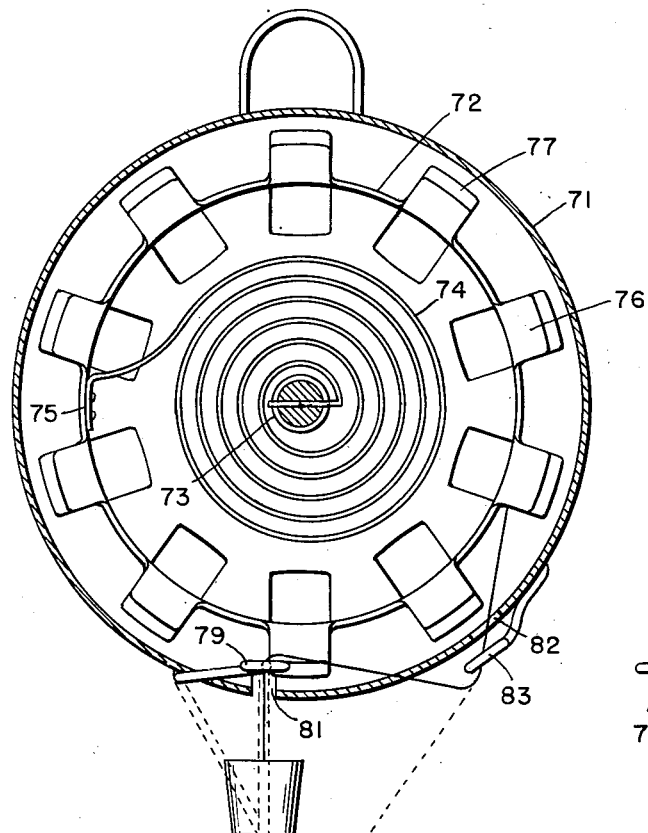
Figure 16:
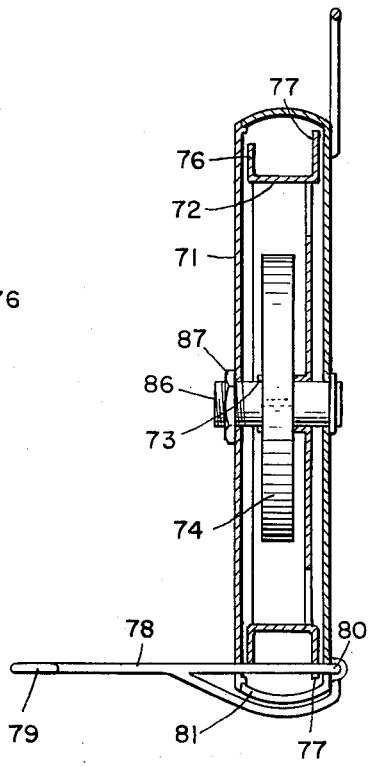
Figure 17:
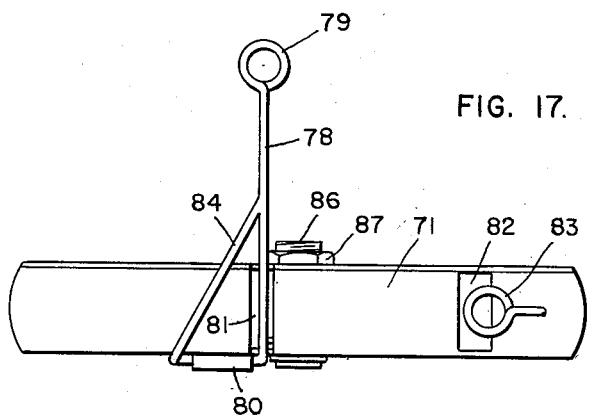

Figure 10 is a view of the portion of the reel showing the trip in release position, Figure 11 is a detailed view showing the mounting of the trip on the reel housing, Figure 12 is a sectional view of a slightly different form of the reel, Figure 13 is a bottom view of the reel shown in Figure 12, Figure 14 is a view of a portion of the reel showing the mounting of the reel trip, Figure 15 is a sectional view showing a different form of reel mounted within the housing, Figure 16 is a vertical section of the reel shown in Figure 15, and Figure 17 is a bottom view of the reel shown in Figures 15 and 16.

Figure 1:
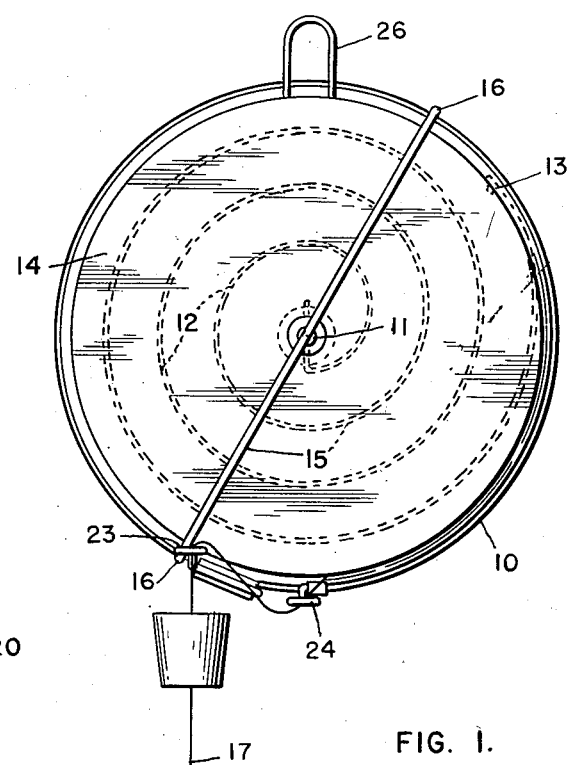
Figure 1 is a view in side elevation of the automatic reel.
Figure 2:
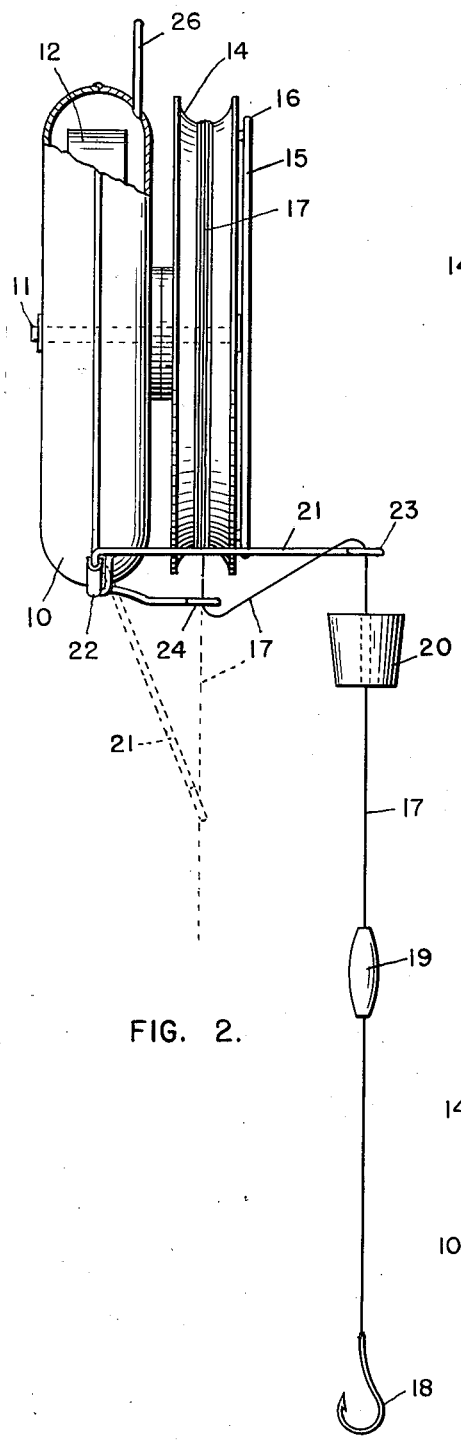
Figure 2 is an end view of the reel looking from the right of Figure 1.
Figure 3:
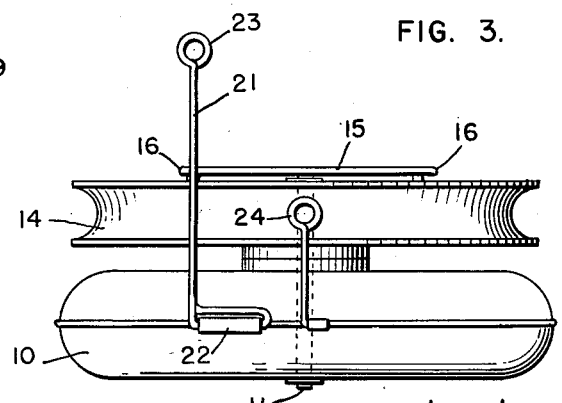
Figure 3 is a plan view looking from below in Figures 1 and 2.

Referring to the drawings by numbers, the same numbers designating the same parts in the several views, and first considering the construction shown in Figures 1 to 3, inclusive, a split or sectional housing 10 held together by a shaft 11 passing through the housing members on which shaft housing 10 is rotatably mounted. Shaft 11 is coupled to one end of a spring 12 of the clock or ribbon spring type, the other end of the spring being anchored at 13 to the wall of housing 10, spring 12 serving to impart rotation in one direction to the shaft 11 when the spring is wound up or tensioned. Shaft 11 extends outwardly from housing 10 and to the extended end of the shaft is secured a reel 14 which rotates with shaft 11, suitable shaft bearings being provided between the housing and reel. On the outer face of the reel 14 an arm 15 is mounted, said arm 15 being here shown as a single rod extending diametrically of the reel externally thereof with its two ends 16 forming fixed stops extending beyond the periphery of reel 14. The stops 16 may be differently formed, and increased or decreased in number if desired.

With the construction shown it will be seen that the tensioned spring 12, when released, will rotate reel 14; reel in the line 17 which is wound thereon, and pull in the hook 18, weight 19, float 20, and hooked fish.

Normally, after cast of the baited hook has been made, the reel 14, shaft 11, and spring 12, which spring is tensioned by rotating the reel and shaft to make the cast so as to set the spring, will be held against reeling-in action by means of an externally disposed trip or release 21, here shown as pivoted at 22 on the outside of housing 10 near the bottom, and through an end loop 23 of which trip the line 17 passes. Trip 21 normally lies in the position shown in Figure 1 in a plane which passes through the shaft 11 so as to engage a stop 16 and prevent rotation of the reel. Line 17 passes through a fixed loop 24 mounted on the casing 10 substantially parallel to the trip 21 and disposed opposite the periphery of the reel and is then guided to loop 23 of the trip 21, which trip will pivot under the pull of a hooked fish on the line 17. By placing the fixed loop 24 in substantially parallel relation to the movable loop 23 and disposing it opposite the periphery of the reel 14, a very effective relation of the parts is provided which insures a free movement of the line during the tripping action. When stop 16 on the reel is released by the trip, the tensioned spring 12 will rotate shaft 11 and reel 14, reeling in the line and catch. After the catch is removed the spring will be again set by reeling off the line for the cast, the cast made, and the trip put in reel-holding position. The line 17 will pass through the cork 20 with a fairly loose fit, which, while it will maintain the cork in proper floating condition under normal conditions, will, when the line 17 is automatically pulled in and cork 20 strikes trip 21, permit the line to travel through the cork and pulling in of the rest of the line and the catch will be completed.

With this arrangement the bringing in of the catch is entirely automatic and the use of a hand reel is obviated. When set for action and a cast is made, no further attention to the operation of the equipment is necessary, except the removal of the catch, rebaiting, recasting, and setting of the reel and spring for a second operation. The housing 10 may be handled in any desired manner by the user, and one convenient means for using it is to provide a hanger, here shown as a loop 26 on the casing, by which it may be suspended from any suitable support.

In the form of the invention shown in Figures 4, 5, 6 and 7, the same principle is involved, but the structure is somewhat different from that heretofore described.

In this variation the casing is in the form of a cylinder 27 in which is mounted a shaft 28 rotatably mounted in the ends of cylinder 27, one of the ends 29 of cylinder 27 being removable to permit assembling of the parts. Surrounding shaft 28 is a spiral or coil spring 30, one end 31 of which is engaged with shaft 28, and the other end 32 of which is anchored to the end of the cylinder 27, as shown in Figure 5. Shaft 28 projects through the end of cylinder 27, and secured to such projecting end and rotatable therewith is reel 33, having the arm 34 with end stops 35, as in the form earlier described. The externally placed trip 36 having the line loop 37 will be pivoted at 38 to the housing 27 near the bottom thereof in the plane of shaft 28, the line, as it comes from the reel, passing through a fixed loop 39 secured to the housing 27 substantially parallel with the trip 37.

The operation of this device will be similar to that heretofore described, pull on the line by the catch throwing the trip from the full line position to the dotted line position shown in Figure 5. The housing 27 can be conveniently hung from any suitable support by means of the hangers 40.

In the form of the invention shown in Figures 8 to 11 inclusive, the housing 41 is vertically disposed and has the spring actuated shaft 42, with the spiral or coil spring 43 secured at one end to a trunnion 44 supported by the removable cap 45 of the housing, the other end of the spring being secured at 46 to the shaft 42, the lower end of the shaft extending through the end of the housing 41. The reel 47 is fixed to the extended end of the shaft 42 and, as here shown, is provided with an external arm 48 diametrically placed on the reel in a manner similar to the forms heretofore described and having the projecting end stops 49. The trip 50 is pivoted at 51 to the housing and normally is engaged by a stop 49, the trip having a line loop 52 at its end through which the line coming from the reel passes, a fixed line loop 53 mounted on housing 41 being provided to guide the line to the trip. Pull on the line moves the trip 50 from the position shown in Figure 8 to the position in Figure 10, releasing the reel and permitting the spring actuated shaft to pull in the line with the catch. Provision is made in this construction for varying the tension of the spring 43 by providing the trunnion 44 mounted in the cap 45 of the housing and engaged with the end of shaft 42 to rotate it, a knurled nut 54 being provided by means of which the trunnion 44 and shaft 42 can be rotated and the tension of the spring 43 varied. In order to hold the nut and trunnion in any adjusted position, a cross pin 55 is provided which may be removed for rotation of the nut 54 and the trunnion 44 to increase or decrease the tension of spring 43, and on replacement of the pin 55 it will be held against unwinding movement of the spring by engaging the limbs of the supporting loop 56 by which the device may be hung from any suitable support.

In the disclosure found in Figures 12, 13 and 14, a housing 57 is provided having the removable cap 58 and hanger 59. Mounted in the housing is the rotatable shaft 60 having the spiral or coil spring 61 secured at its lower end 62 to the lower head of the housing and at its upper end at 63 to the upper end of shaft 60.

The end of the shaft 60 projects through the lower end of the housing and has secured to it the reel 64 on which the line is wound, this reel having the diametrically placed external arm 65 with the projecting stops 66 at its ends. The trip 67 having the line loop 68 is pivotally mounted at 69 on the housing in position to engage a stop 66 on the reel, a fixed loop 70 being secured to the housing through which the line passes from the reel to the trip. If desired, the trip may be elongated, as shown in dotted lines in Figures 12 and 13, so as to give a longer trip and greater leverage.

In operation the device will function in a manner similar to those already described.

In the development shown in Figures 15, 16 and 17, a split or divided housing 71 is provided, within which a reel 72, preferably formed of a single stamping, is mounted on a hollow axle 73, a clock or ribbon type spring 74 being attached at one end to the axle 73 and at its other end at 75 to the reel 72. The reel 72 will be provided with radially disposed line guides 76 in the form of radially extending wings at intervals about its periphery to guide and hold the line on the reel. One wing of the guides will be extended so as to form stops 77 which will be engaged by the trip 78, as shown in Figure 16, the trip having the loop 79 through which the line coming from the reel passes. The trip 77 is pivoted at 80 to the housing 71 near the bottom thereof, and lies in a slot 81 in the housing 71 when in normal position with the stop 77 on the guide 76 in engagement therewith. The line passes through an opening 82 in the housing and a fixed guide loop 83 on the housing to the loop 79 of the trip 78, so that pull upon the line will swing the trip 78 downwardly, releasing the reel, and the spring 74 will at once set up a reeling in action and pull on the line. The trip 78 may be reinforced by providing an inclined limb 84, as shown in Figure 17, which inclined limb of the trigger 78 will clear the outside of the housing 71, the triangular portion of the trip being pivoted at 80 on the housing. The split housing shaft and reel may be held in assembled relation in any suitable fashion. As here shown, a headed bolt 86 having a nut 87 threaded on one end is provided, said bolt passing through the sections of the housing and the hollow axle. This permits the ready assembling and disassembling of the parts.

In operation, when the trip is pulled the reel will be released and the spring will then reel in the line and the catch.

Following the disclosures herein, an automatic fishing reel of simple construction is provided and in which manual manipulation of the various parts to effect the functioning of the reel is done away with and the necessity for manually applied brakes and pressure devices to control the action of the reel are entirely eliminated, resulting in a reel having few parts, and one which is entirely automatic in its operation.

While various modifications of the construction are here shown, it will be understood that changes may be made from these disclosures without departing from the principle of the invention, and all such changes as involve only mechanical skill and are comprehended by the appended claims are to be regarded as within the range of the invention.

I claim:

1. An automatic fishing reel comprising a sectional housing, a shaft rotatably mounted in said housing and having an end projected outwardly therefrom, a reel-actuating spring anchored at one end to the inner face of said housing and engaging said shaft at its other end, a reel mounted on and rotatable with the projected end of said shaft, externally disposed stops consisting of peripheral projections on the outer face of said reel, and a trip pivotally mounted externally of said housing at a point adjacent the periphery of said reel and movable relative to said reel and housing and responsive to pull on the line to release said spring-actuated reel.

2. The invention as defined in claim 1 in which the spring is enclosed in the housing and a plurality of radially disposed stops are mounted on the reel.

3. The invention as defined in claim 1 in which a fixed line guide disposed adjacent the periphery of the reel is mounted on the housing to lead the line to the trip.

4. An automatic fishing reel comprising a sectional housing, a hanger for said housing, a shaft rotatably mounted in said housing and having an end projected outwardly therefrom, a spring anchored at one end to the inner face of said housing and engaging said shaft at its other end for shaft rotation, a reel mounted on and rotatable with the projected end of said shaft, radially disposed projections on the external face of said reel extending beyond the periphery thereof to restrain rotation of said reel, and a stop engaging trip responsive to pull on the line pivoted externally of said housing at a point adjacent the periphery of said reel and extending across the periphery thereof to release said reel for rotation by said spring.

5. The invention as defined in claim 4 in which the shaft is coupled at one end to a manually operable shaft-engaging trunnion rotatably mounted in the end of the housing by means of which the shaft may be rotated and the tension of the spring varied.

6. The invention as defined in claim 5 in which the trunnion is provided with means for holding it and the spring in adjusted position.

7. The invention as defined in claim 5 in which a reel-supporting hanger is provided and means engageable with the hanger for holding the spring in adjusted position.

8. An automatic fishing reel comprising a sectional housing, a reel rotatably mounted relative to said housing, radial line guides on the exterior of said reel projecting radially from said reel, extended guide members forming reel stops, a spring in said housing to rotate said reel, and a trip member releasable under line pull pivoted on said housing at a point adjacent the periphery of said reel and extending across the face thereof to engage one of said reel stops and restrain rotation.

9. The invention as defined in claim 8 in which the reel is rotatably mounted in said housing.

10. The invention as defined in claim 9 in which the trip engages the reel stop through a slot in the housing.

11. The invention as defined in claim 9 in which the line extends from the reel through an opening in the housing.

12. The invention as defined in claim 1 in which the rotatable shaft is disposed transversely to the housing and the spring is mounted within said housing surrounding said shaft.

13. The invention as defined in claim 1 in which the rotatable shaft is disposed longitudinally in the housing and the spring extends longitudinally of the shaft.

14. An automatic fishing reel comprising a housing, a shaft rotatably mounted in said housing and having an end projected outwardly therefrom, a peripherally open line-receiving reel fixedly mounted on and rotatable with said shaft, a spring anchored at one end to the inner face of said housing and engaging said shaft at its other end, externally disposed stops on said reel consisting of a series of peripheral projections from the outer face of said reel to restrain reel rotation, and a line-engageable movable trip pivoted externally of said housing at a point adjacent the periphery of said reel and extending across the periphery thereof to engage one of said reel stops and hold said reel against rotation.

15. An automatic fishing reel comprising a housing, a shaft rotatably mounted in said housing and having an end projected outwardly therefrom, a peripherally open line-receiving reel fixedly mounted on and rotatable with said shaft in spaced relation to said housing, a spring anchored at one end to the inner face of said housing and engaging said shaft at its other end, a diametrically disposed rod mounted exteriorly of said reel on its outer face and having stop members extending radially beyond the periphery of said reel to restrain reel rotation, and a line-engageable movable trip pivoted externally on said housing at a point adjacent the periphery of said reel and extending across the periphery thereof to engage said radially projecting reel stops and hold said reel against rotation.

JOHN W. WHITE, Jr.

REFERENCES CITED

The following references are of record in the file of this patent:

UNITED STATES PATENTS

| Number | Name | Date |
| --- | --- | --- |
| 1,023,853 | Kadla | Apr. 23, 1912 |
| 1,177,885 | Molnar | Apr. 4, 1916 |
| 1,524,011 | Ballew | Jan. 27, 1925 |
| 1,975,385 | Bachus | Oct. 2, 1934 |
| 2,181,141 | Lovegran | Nov. 28, 1939 |
| 2,194,088 | Joabson | Mar. 29, 1940 |
| 2,303,668 | Tilbury | Dec. 1, 1942 |